US006411751B1

(12) United States Patent
Giles et al.

(10) Patent No.: US 6,411,751 B1
(45) Date of Patent: Jun. 25, 2002

(54) SYSTEM AND METHOD FOR TRAINING AN OPTICAL CROSS-CONNECT COMPRISING STEERABLE SWITCHING ELEMENTS

(75) Inventors: Randy Clinton Giles, Whippany; Albert M Gottlieb, Maplewood; David Thomas Neilson, Old Bridge, all of NJ (US)

(73) Assignees: Lucent Technologies Inc., Murray Hill, NJ (US); Agere Systems Guardian Corp., Orlando, FL (US)

( * ) Notice: Subject to any disclaimer, the term of this patent is extended or adjusted under 35 U.S.C. 154(b) by 39 days.

(21) Appl. No.: 09/680,753

(22) Filed: Oct. 6, 2000

Related U.S. Application Data

(60) Provisional application No. 60/158,475, filed on Oct. 8, 1999.

(51) Int. Cl.[7] .............................. G02B 6/26; G02B 6/42
(52) U.S. Cl. ............................. 385/16; 385/18; 324/97; 364/713
(58) Field of Search ...................... 385/16, 18; 324/97; 364/713

(56) References Cited

U.S. PATENT DOCUMENTS

| | | | | |
|---|---|---|---|---|
| 4,560,925 A | * | 12/1985 | Niven et al. | 324/97 |
| 5,333,117 A | * | 7/1994 | Ha et al. | 364/713 |
| 5,960,132 A | * | 9/1999 | Lin | 385/18 |

* cited by examiner

Primary Examiner—Brian Healy
Assistant Examiner—Sarah Woo
(74) Attorney, Agent, or Firm—Gregory J. Murgia

(57) ABSTRACT

Signal losses in an optical cross-connect having steerable switching elements for routing optical signals are substantially reduced by controllably and selectively training the steerable switching elements as a function of measured input and output power of a cross-connected optical signal. More specifically, adjustments to the alignment of one or more steerable switching elements associated with a particular cross-connection are performed in a non-intrusive manner to increase the optical signal power in an optical signal while maintaining an active cross-connection of the optical signal. In one illustrative embodiment, optical monitoring arrangements monitor the optical signal power of optical signals coupled to the cross-connect inputs and outputs. The cross-connect includes a switching fabric comprising a plurality of steerable MEMS mirror elements used as switching elements for controllably and selectively directing the light beams within the cross-connect. By comparing the measured optical signal power with a previously stored value representing the expected optical signal power for that cross-connection, small adjustments can then be made, as appropriate, to optimize the alignment of the mirrors associated with the cross-connection. For example, if the difference between the measured and expected optical signal power exceeds a prescribed threshold, then a dithering process is initiated whereby individual mirrors are "walked through" alternate tilt positions until the measured optical signal power has been optimized, e.g., increased.

24 Claims, 5 Drawing Sheets

100

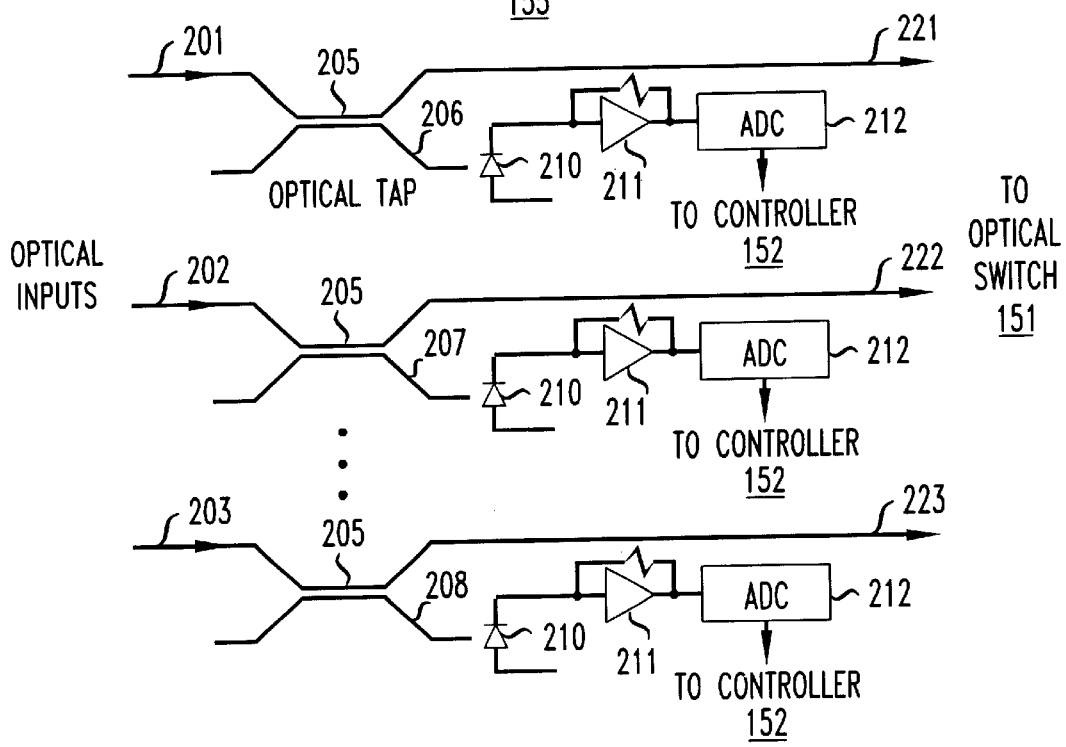
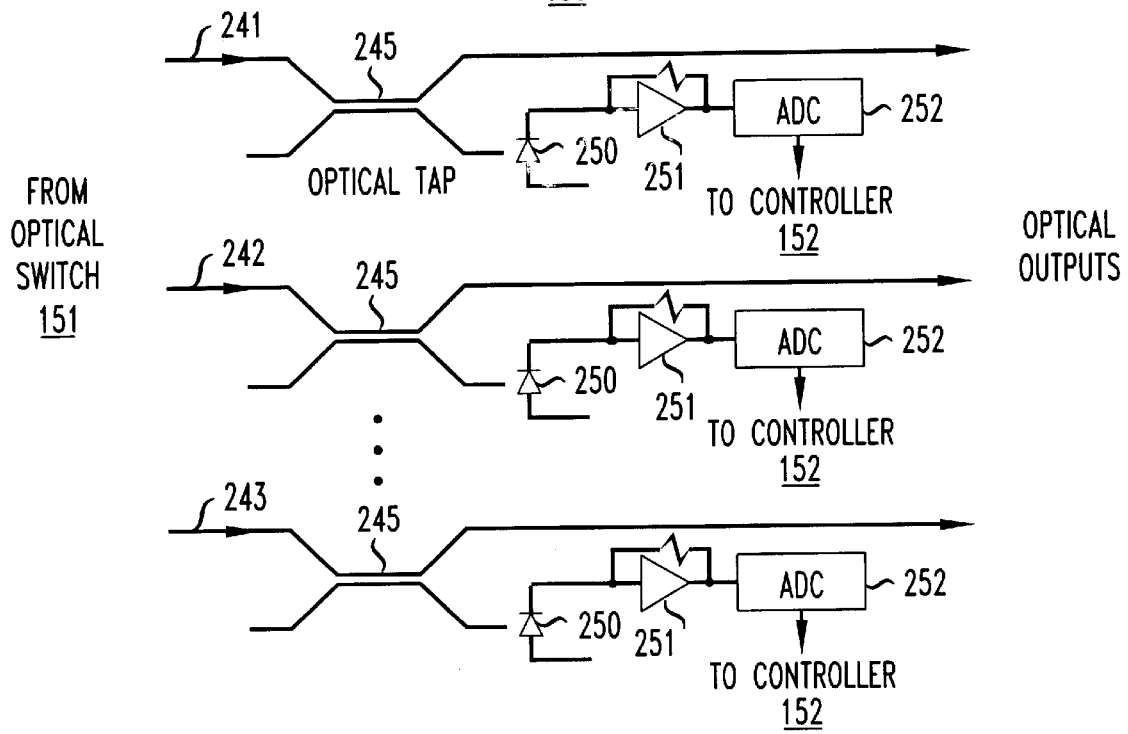

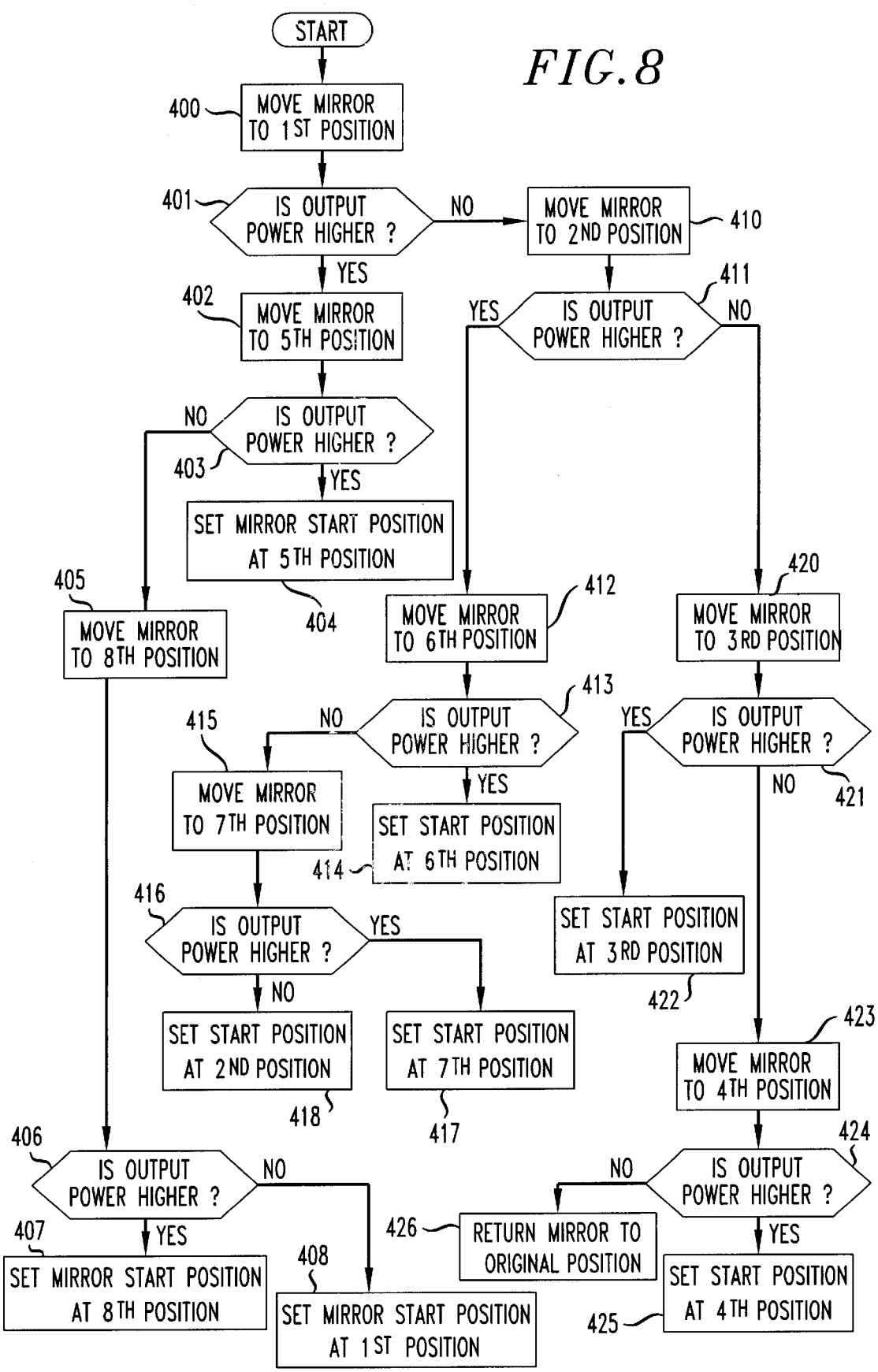

SYSTEM AND METHOD FOR TRAINING AN OPTICAL CROSS-CONNECT COMPRISING STEERABLE SWITCHING ELEMENTS

CROSS-REFERENCE TO RELATED APPLICATION

This application claims the benefit of U.S. provisional application, Ser. No. 60/158,475, entitled "Method and Apparatus for Training a Micro-Electromechanical System-Based Steerable Mirror Array", filed on Oct. 8, 1999, which is incorporated herein by reference in its entirety.

FIELD OF THE INVENTION

The invention relates generally to optical cross-connects and, more particularly, to training the steerable switching elements, such as micro-electromechanical systems (MEMS)-based mirror arrays, used in optical cross-connects.

BACKGROUND OF THE INVENTION

MEMS steerable elements are being used in a variety of applications. For example, clusters of MEMS mirrors are being contemplated for use in optical cross-connects to provide all-optical switching of optical signals through a network. In one such cross-connect application, an optical signal (i.e., light beam) is launched from an input optical fiber through an input lens that focuses the beam onto an input mirror. Control voltages are applied to tilt the mirror on its axes to direct the beam to an output mirror. In a similar manner, the output mirror is tilted on its axes by control voltages to direct the beam through an output lens to an output optical fiber. By controllably tilting the input and output mirrors, optical signals can therefore be switched between the various inputs and outputs of the optical cross-connect.

Performance of optical cross-connects that use steerable mirrors largely depends on how well the input and output mirrors are aligned for a particular cross-connection; that is, whether the steerable mirrors are tilted to provide maximum optical signal power for the optical signal being switched. One approach for ensuring that mirrors can be aligned properly is to measure and store the control voltages as factory settings for each possible cross-connection, e.g., for each possible input-to-output pairing. These stored values are then used to control the establishment of cross-connections. However, a problem arises during operation of the cross-connect that may cause the mirrors to be out of alignment even when the factory settings are used to establish cross-connections. For example, small changes in the system may occur due to temperature, aging of components, drifts in control voltages, mirror characteristics, and so on. These changes can cause improper alignment of the mirrors and subsequent signal losses.

So-called indirect methods are known for attempting to determine the actual position of a MEMS mirror in such an arrangement. Indirect methods typically use a light source (e.g., infrared radiation) and a camera (e.g., charge coupled device), whereby the light source is used to illuminate a mirror and the camera is used to record the position of the reflected light. The position of the MEMS mirror is then calculated based on knowing where the light source is located as well as the measured position of the light recorded by the camera. This information along with information about the control voltage levels associated with the respective positioning of the mirrors is then stored, e.g., in a database. Among other disadvantages, this method becomes unwieldy as the number of mirrors in the cluster become large. Moreover, this approach can be very disruptive if used during the cross-connect operation, e.g., when illuminating a mirror that is being used for an active cross-connection. Consequently, this technique is limited to use before a system is placed in operation, e.g., "coarse" training of the MEMS mirror array during factory setup, system initialization, and so on.

SUMMARY OF THE INVENTION

Signal losses caused by changes in the alignment of steerable switching elements used for cross-connecting an optical signal are substantially reduced according to the principles of the invention by controllably and selectively training the steerable switching elements as a function of measured input and output power of the cross-connected optical signal. More specifically, training of one or more steerable switching elements associated with a particular cross-connection is performed by dithering (or re-aligning) the tilt position of the one or more switching elements to increase the optical signal power in the optical signal without disrupting the active cross-connection of that optical signal. Because measurement of optical signal power and control of switching elements is performed as a function of only the particular cross-connected optical signal, the training technique according to the principles of the invention requires less extensive processing resources as compared to the prior art methods. Moreover, for a large capacity optical cross-connect having clusters of steerable switching elements, the individual cross-connections can be independently and simultaneously trained according to the principles of the invention.

In one illustrative embodiment, optical monitoring arrangements monitor the input and output optical signal power of optical signals coupled to the cross-connect inputs and outputs. The cross-connect includes a switching fabric comprising a plurality of steerable MEMS mirror elements used as switching elements for directing the light beams within the cross-connect. By comparing the actual optical power loss (e.g., measured input power minus measured output power) with a previously stored value representing the expected optical power loss for a particular cross-connection, small adjustments can then be made, as appropriate, to optimize the alignment of the mirrors associated with the cross-connection. For example, if the difference between the measured and expected optical power loss exceeds a prescribed threshold, then a dithering process is initiated whereby the individual mirrors are "walked through" alternate tilt positions until the measured optical signal power has been optimized, e.g., increased. By scaling the optical signal power measured at the output as a function of the optical signal power measured at the input, the output optical signal power can be normalized with changes in input optical signal power to provide more accurate alignment adjustments and to avoid unnecessary adjustments. For example, when a legitimate or otherwise acceptable change in input power is correspondingly measured, output power may be expected to change such that unnecessarily changing positions of the mirrors would not achieve any greater output power.

BRIEF DESCRIPTION OF THE DRAWING

A more complete understanding of the present invention may be obtained from consideration of the following detailed description of the invention in conjunction with the drawing, with like elements referenced with like references, in which:

FIGS. 4–5 are simplified schematic diagrams of exemplary monitoring arrangements that can be used in the illustrative embodiment shown in FIG. 3;

FIG. 8 is a simplified flow diagram of a method for aligning a MEMS mirror element according to the principles of the invention.

DETAILED DESCRIPTION OF THE INVENTION

Although the illustrative embodiments described herein are particularly well-suited for controlling the position of MEMS-based steerable mirror arrays in optical cross-connects, and shall be described in this exemplary context, those skilled in the art will understand from the teachings herein that the principles of the invention may also be employed in conjunction with other network elements with optical switching capability based on steerable elements. Accordingly, the embodiments shown and described herein are only meant to be illustrative and not limiting.

Figure 1:
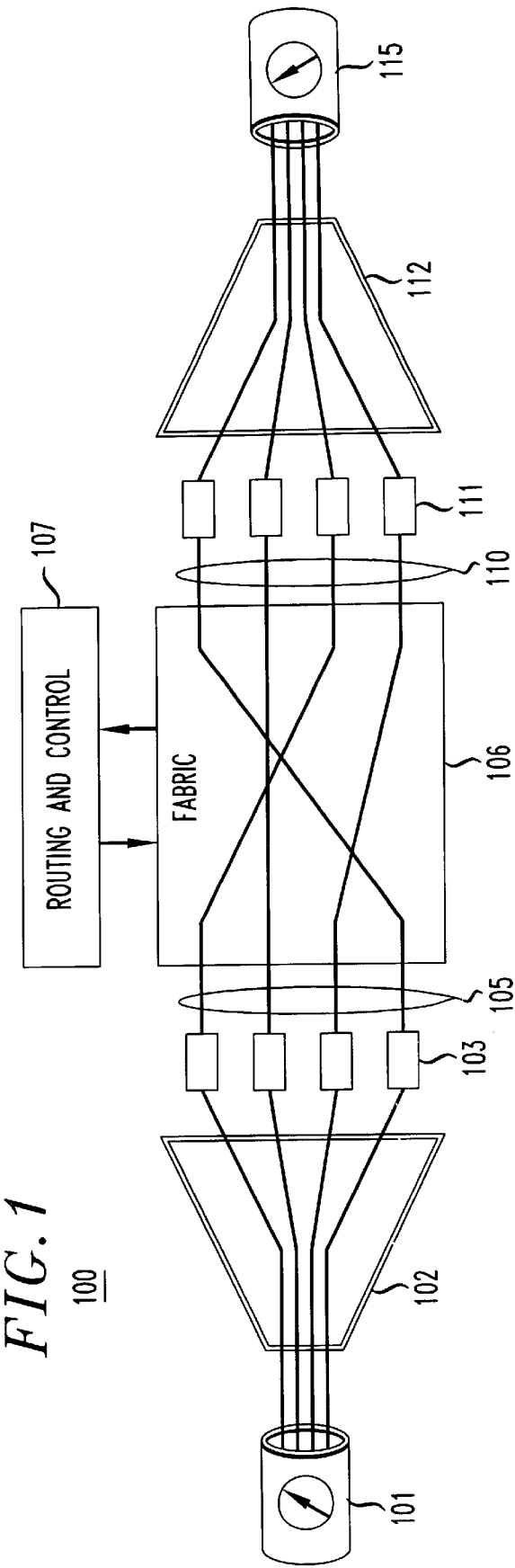
FIG. 1 is simplified diagram of an exemplary optical cross-connect arrangement for a DWDM application in which the principles of the invention may be used.

Before describing specific embodiments of the invention, a general description of an optical cross-connect arrangement will be provided by way of introduction to set forth the context in which the principles of the invention can be employed. More specifically, FIG. 1 shows an exemplary optical cross-connect arrangement 100 used in a wavelength division multiplexed (WDM) system application. More specifically, an input optical fiber 101 carries a WDM optical signal comprising a plurality of optical channels at different wavelengths according to well-known principles. Optical demultiplexer 102 separates the WDM optical signal into individual optical channels, each at a different wavelength, and supplies these individual optical channels to switch fabric 106 via interfaces 103. Under the control of routing and control element 107, the optical channels are switched between various inputs 105 and outputs 110 of switch fabric 106. The optical channels from outputs 110 of switch fabric 106 are then supplied via interfaces 111 to optical multiplexer 112 which combines the individual optical channels into a composite WDM signal for transmission through output optical fiber 115.

Figure 2:
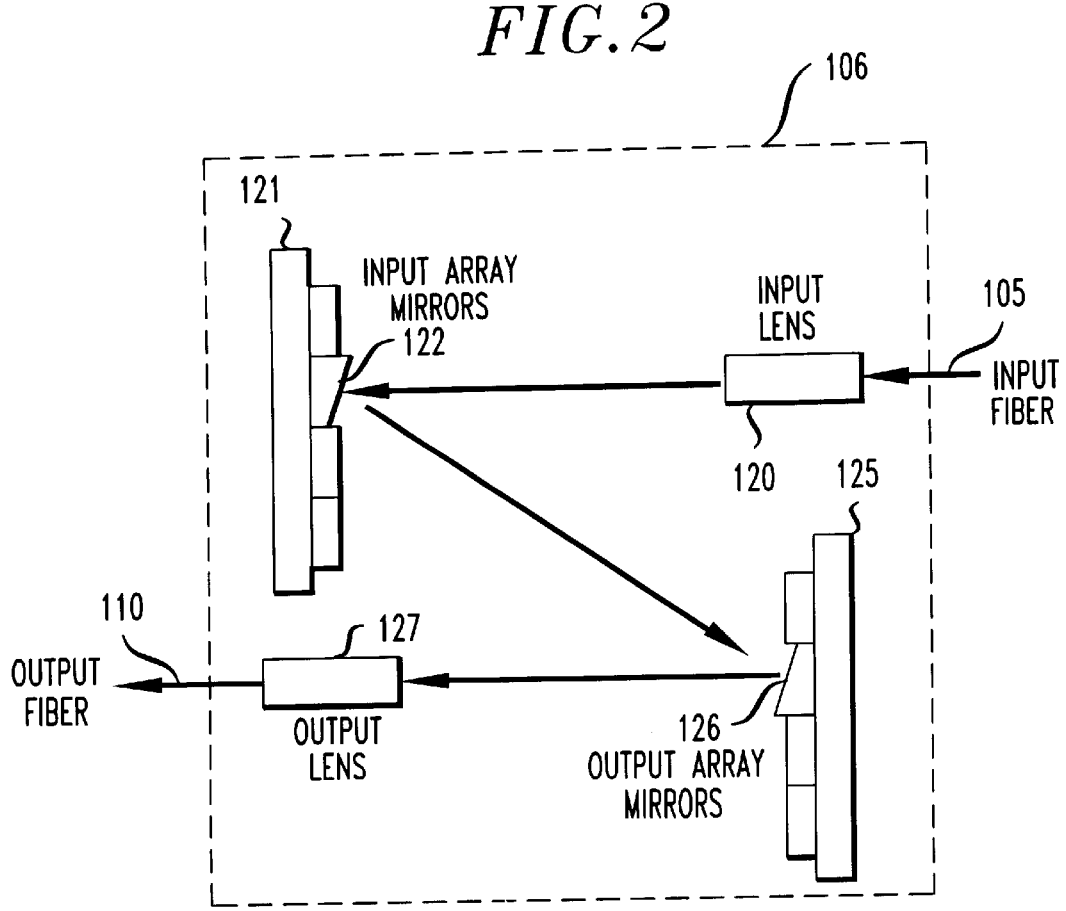
FIG. 2 is a simplified block diagram of a MEMS-based steerable mirror array that can be used in the cross-connect arrangement shown in FIG. 1.

FIG. 2 shows one illustrative embodiment of switch fabric 106 for optical cross-connect 100 (FIG. 1). In this example, switch fabric 106 incorporates MEMS-based steerable mirror arrays to effect the switching of optical signals between input optical fiber 105 and output optical fiber 110. As shown, switch fabric 106 includes an input lens 120 for receiving the incoming optical signal and an input mirror array 121 for selectively and controllably directing the incoming optical signal. For example, input mirror array 121 comprises a plurality of individual mirrors, such as mirror element 122, which are individually controlled (as will be described hereinafter) to direct the incoming light beam to an individual mirror element, e.g., mirror element 126 in output mirror array 125. The operation of input and output mirror arrays 121 and 125, respectively, are similar in that the incoming light beam can be steered by adjusting the position of the individual mirror elements. In this example, mirror element 122 is controllably moved to steer the incoming light beam to mirror element 126 on output mirror array 125. Similarly, mirror element 126 is controllably moved to steer the reflected light beam through output lens 127 to a selected output optical fiber 110.

In one embodiment, the MEMS-based steerable mirror arrays are arrays of small silicon mirrors, e.g., 500 microns in diameter. These mirrors rotate (e.g., tilt) on micromachined hinges such that their tilt is determined by control voltages that are applied to control electrodes on an underlying substrate. For example, four electrodes can be used to rotate a mirror in four quadrants of tilt. In one exemplary embodiment, only two control voltages are applied to a mirror at a time with the other two voltages set to 0Vdc. High voltage digital-to-analog converters can be used to supply control voltages to the electrodes of an individual mirror element to cause the mirror to tilt in a desired direction to steer a light beam. By way of example in one embodiment, full tilt on a mirror is approximately 5 degrees and requires a control voltage of approximately 160Vdc. Other methods for controlling the operation of a MEMS-based optical cross-connect will be apparent to those skilled in the art and are contemplated by the teachings herein.

As can be appreciated by those skilled in the art, the precise movement and alignment of the individual mirror elements, e.g., mirror elements 122 and 126, determines the quality of the optical signal being supplied at the output optical fiber 110. That is, the signal strength of the optical signals at the output of switch fabric 106 will be a function of the accuracy of the positioning and movement of the steerable elements within switch fabric 106. The initial determination of control voltage settings required for each of the possible cross-connections (e.g., mirror tilt for each of the mirror pair configurations used for a cross-connection) is typically determined by a calibration procedure in the factory environment. These control voltage settings are then typically stored in a database, e.g., a factory-provisioned mirror training database, for subsequent access by the control mechanism during operation of the cross-connect. However, the subject of the invention is the "fine tuning" or subsequent "training" of the mirrors that occurs in real time to compensate for the effects of temperature, aging, drift, and so on after a cross-connect has been placed into an operating environment.

Figure 3:
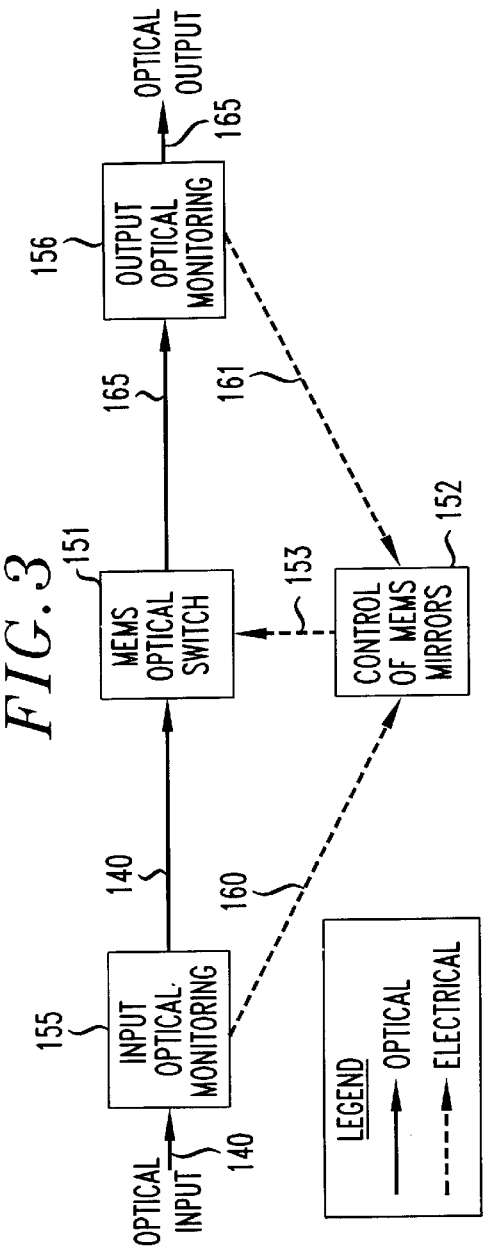
FIG. 3 is a simplified block diagram of an illustrative embodiment of the invention for use with a MEMS-based cross-connect such as that shown in FIG. 1.

FIG. 3 illustrates one exemplary embodiment of the invention for use with a MEMS-based optical cross-connect, such as one based on the use of steerable mirror elements as shown and described previously in FIGS. 1 and 2. As previously described, a MEMS-based optical switch 151 can be used for cross-connecting or otherwise switching optical signals at the optical layer without converting the signals into electrical form. One implementation of optical switch 151 includes MEMS-based steerable mirror arrays for directing optical signals (i.e., light beams) from any input port to any output port of optical switch 151. Control of optical switch 151 by controller 152 occurs via control path 153. In particular, controller 152 provides control signals via control path 153 to change the position (e.g., tilt) of individual mirror elements within optical switch 151 according to prescribed cross-connection requests. Cross-connect control techniques are well-known to those skilled in the art, e.g., the use of cross-connect maps to execute cross-connect requests, to setup cross-connections, tear down cross-connections, and so on. Typically, a system controller sends cross-connect commands that are then executed by retrieving and then applying the control voltage settings to the control electrodes to cause the desired tilt of the individual mirrors.

As mentioned, optical cross-connects using steerable elements, such as MEMS-based mirror elements, are susceptible to problems when the mirrors are not aligned properly. Some of the problems that can be caused by misalignment of mirrors could be an improper cross-connection setup (e.g., if an optical signal is misdirected to the wrong output port) or an undesirable optical signal power level (e.g., below the receiver sensitivity thresholds). As previously described, misalignments can occur as a result of drift, component aging, temperature-related effects, and so on. In general, optical signals being switched through the switch fabric need to have sufficient optical signal power for desirable transmission performance. According to the principles of the invention, a technique is employed whereby the mirrors associated with a cross-connection are further "trained" to improve the alignment of the mirrors which, in turn, improves the optical signal power level of the signal being cross-connected or otherwise switched through the switch fabric.

In FIG. 3, optical monitoring arrangements are provided at the inputs and outputs of optical switch 151. For simplicity of illustration and explanation, the embodiment shown in FIG. 3 will be described in the context of a single cross-connection involving one input and output. However, those skilled in the art will appreciate that the principles of the invention are applicable to any size optical cross-connect, e.g., any number of inputs and outputs. More specifically, FIG. 3 shows input optical monitoring arrangement 155 coupled to an input side of optical switch 151 and output optical monitoring arrangement 156 coupled to an output side of optical switch 151. Each of optical monitoring arrangements 155 and 156 is further coupled to controller 152. It should be noted that the dotted lines (e.g., lines 153, 160, 161) are meant to refer to electrical signals while solid lines (e.g., lines 140, 165) are meant to refer to optical signals (i.e., light beams).

Briefly, in operation, input optical monitoring arrangement 155 receives an incoming optical signal via input optical fiber 140 and measures the input optical signal power of the incoming optical signal. The incoming signal is then supplied to an input of optical switch 151. Under the control of controller 152, optical switch 151 cross-connects the incoming optical signal from an input to an output of optical switch 151 as prescribed by the particular cross-connection scenario (e.g., according to a prescribed cross-connection in the cross-connect map). At the output of optical switch 151, the cross-connected optical signal is then supplied to output optical monitoring arrangement 156 where the optical signal power is again measured. As shown, input optical monitoring arrangement 155 supplies an electrical signal to controller 152 which is indicative of the optical signal power of the optical signal at the input of optical switch 151. Similarly, output optical monitoring arrangement 156 supplies an electrical signal to controller 152 which is indicative of the optical signal power of the optical signal at the output of optical switch 151. Responsive to the measured input and output optical signal power, controller 152 then facilitates, as appropriate, the training of the mirrors in optical switch 151 which are associated with the particular cross-connection.

In general, this technique is based on the premise that further adjustments, e.g., fine tuning, of the mirror positions beyond the initial positions established during the cross-connection setup request will optimize the optical signal power of the cross-connected optical signal. This is accomplished according to the principles of the invention as a function of measured optical signal power, whereby input and output signal power are used to determine whether and how much the mirrors need to be further adjusted. The operation of controller 152, e.g., mirror alignment algorithm, will be described in further detail below. Those skilled in the art will recognize that such a control scheme can be implemented using software-based or hardware-based control mechanisms or a combination of both.

FIGS. 4 and 5 show exemplary embodiments of the input and output optical monitoring arrangements 155 and 156, respectively, shown and described in FIG. 3. More specifically, FIG. 4 shows one illustrative embodiment for monitoring optical signal power at the input side of optical switch 151 (FIG. 3) and FIG. 5 shows one illustrative embodiment for monitoring optical signal power at the output side of optical switch 151 (FIG. 3).

In FIG. 4, input optical monitoring arrangement 155 includes a plurality of optical taps 205, each for receiving an incoming optical signal. For purposes of this example, a plurality of inputs 201–203 are shown, each of which is capable of carrying an optical signal. Optical taps 205 can be any type of commercially available device such as, for example, a 4% optical power tap whereby 4% of the optical signal power is tapped off from the main signal and supplied via the respective paths 206–208 while 96% of the optical signal power is passed through in the main signal along respective paths 221–223.

Input optical monitoring arrangement 155 further includes photodetectors 210 for detecting the incoming optical signal power for the respective optical signals that are tapped by optical taps 205. Again, the different types and the principles of operation of photodetectors are well known. By way of example, photodetector 210 can be implemented with a commercially available PIN diode. In a conventional manner, the output from photodetector 210 is supplied to a transimpedance amplifier circuit 211 for current-to-voltage translation and then to analog-to-digital converter (ADC) 212 for digital conversion of the analog signal. The signals supplied from analog to digital converters 212 are then used for effecting control of optical switch 151. Referring again to FIG. 3 by way of example, the outputs from analog to digital converters 212 could be supplied via path 160 to controller 152. The use of these control signals will be described in further detail below. As shown in FIG. 4, the portion of the incoming optical signals (from inputs 201–203) that are not tapped at optical taps 205 are supplied via paths 221–223 to optical switch 151 (FIG. 3).

Output optical monitoring arrangement 156 depicted in FIG. 5 has similar components and operates in a similar manner as input optical monitoring arrangement 155 in FIG. 4. For example, optical signals supplied at the output side of optical switch 151 (FIG. 3) are received via paths 241–243 and tapped by optical taps 245 in a similar manner as previously described. Photodetectors 250, transimpedance amplifier 251, and analog-to-digital converters 252 operate in a similar manner as previously described for the arrangement in FIG. 4 and will not be repeated here for sake of brevity. Again, the significant difference between the embodiments shown in FIGS. 4 and 5 is that output optical monitoring arrangement 156 is used for deriving information about the optical signal power of optical signals at the output side of optical switch 151 (FIG. 3) while input optical monitoring arrangement 155 is used for deriving information about the optical signal power of optical signals at the input side of optical switch 151 (FIG. 3), both of which are supplied to controller 152 to effect appropriate control over the steerable elements in optical switch 151.

Figure 6:
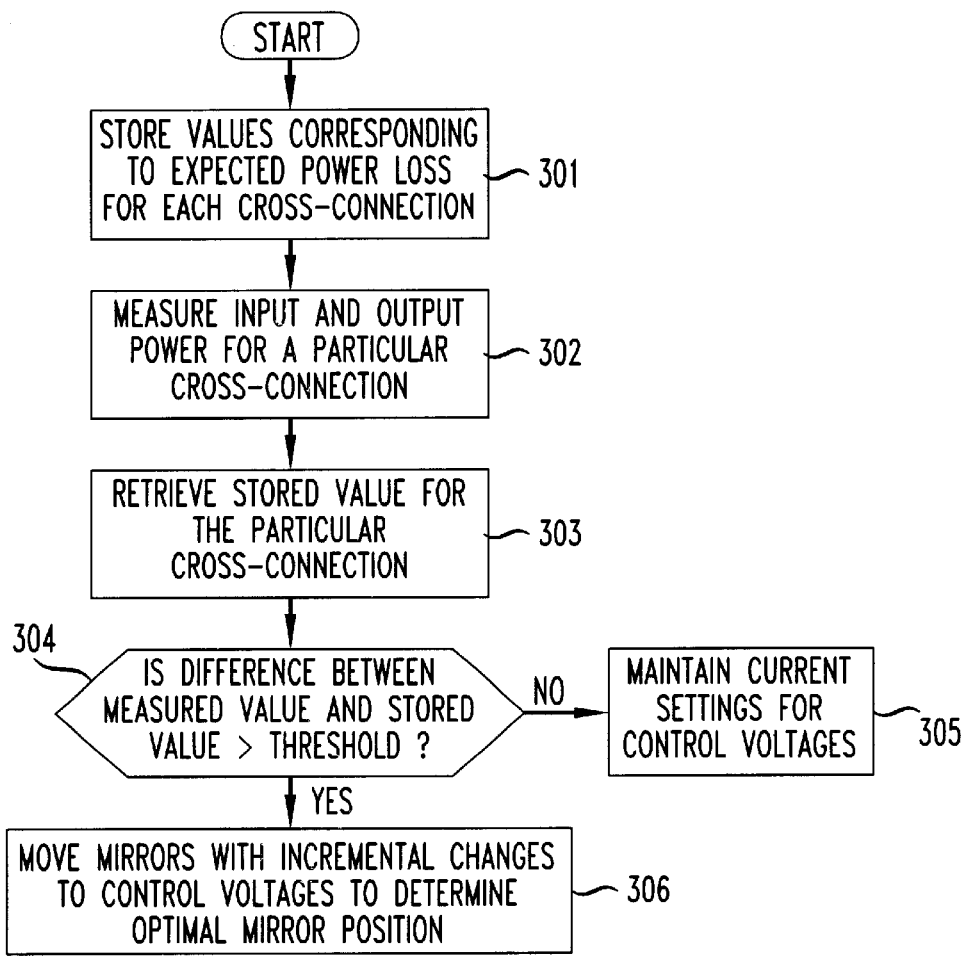
FIG. 6 is a simplified flow diagram of a method according to the principles of the invention.

FIG. 6 shows one illustrative embodiment of a method for "training" the steerable mirror-based optical cross-connect according to the principles of the invention. As previously described, an initial determination of control voltage settings required for each of the possible cross-connections (e.g., mirror tilt for each of the mirror pairs used for a cross-connection) is typically made using a calibration procedure in the factory environment. These control voltage settings would then be stored in the factory-provisioned mirror training database for subsequent access by the control mechanism during operation of the cross-connect. In a corresponding manner, step 301 includes storing values that correspond to expected signal power loss through each cross-connection, i.e., each possible input to output pairing in the cross-connect. These values would typically be stored in a database and can be baselined in the factory environment by setting up each cross-connection and then measuring the respective signal power. Optical signal power losses associated with a particular cross-connection can be attributable to connectors in the cross-connection path, switch fabric losses, optical tap/coupler losses, and so on.

After a particular cross-connection has been set up (e.g., in optical switch 151 (FIG. 3)), the actual input and output optical signal power are then measured for the particular cross-connection in step 302 to determine the actual power loss, e.g., measured input power minus measured output power. In step 303, the stored value, e.g., expected power loss, for that particular cross-connection is retrieved from a database and then compared to the actual power loss obtained in step 302. If the difference between the actual and expected power loss (i.e., delta) does not exceed a prescribed threshold, then the present alignment settings of the mirrors associated with the particular cross-connection can be maintained as shown in step 305. That is, the mirror alignment obtained with the current control voltages (e.g., the control voltage settings determined at the factory) can remain as initially set because the tilt of the mirrors already provides optical signal power for the cross-connection that meets the prescribed criteria, e.g., threshold. The prescribed threshold for the difference (delta) between the actual and expected power loss in one embodiment could be set to 0.3dB. So, if the difference (delta) is legs than 0.3dB, then there is no need to further adjust (i.e., fine tune) the mirrors.

Continuing with this example, assume that the stored value for expected power loss in the database is −6.9dB. If the actual power loss for the cross-connection (e.g., measured input power minus measured output power) is not less than −7.2dB, then the present settings can be maintained. Of course, the selection of the prescribed threshold for the delta is a matter of design choice. In fact, the use of a prescribed threshold at all is a matter of design choice although it might be a preferable design choice when it is desirable to avoid continuous fine tuning, i.e., tweaking, of the mirror positions. Instead, the use of a prescribed threshold assumes that some degree of variation that does not affect signal quality and so on is acceptable.

When the difference between the actual (measured) and expected (stored) power losses is greater than the threshold in step 304, then the mirrors are moved to achieve optimal alignment as will be described below in further detail. In general, the adjustments to mirror alignment are accomplished by making changes to the control voltages applied to the electrodes associated with a mirror to cause a change in the degree of tilt. By controllably and selectively changing the control voltages, the mirrors are "walked through" alternate tilt positions until the measured optical signal power has been optimized, e.g., increased. These further adjustments to the mirror alignment (i.e., beyond the factory settings) will be referred hereinafter as "dithering". In general, the dithering process is a multi-step process intended to reduce the loss through the optical cross-connect by deriving mirror alignment settings that pass the most optical power for a signal. The dithering process according to the principles of the invention moves the mirrors in steps incremental to the factory-provided mirror training settings. Readings from the output monitoring arrangement can be used to gauge the success of each incremental movement. Dithering can be a scheduled event (e.g., during cross-connection setup) or can be run as a background operation on a periodic basis, for example.

Using the preceding example whereby a pair of mirrors (input mirror and output mirror) is used for a cross-connection, there are several different approaches that can be followed for aligning or dithering the mirrors, several of which will be described herein. In one approach, dithering can be performed one mirror at a time. That is, the dithering process is carried out on the input mirror and, after that has completed, then on the output mirror. In another approach, dithering can be performed on two mirrors at the same time whereby each of the mirrors is moved in a parallel relationship such that each mirror is moved (or walked through) the same positions at substantially the same time. In yet another approach, dithering can be performed on two mirrors at the same time whereby each of the mirrors is moved in an "anti-parallel" relationship such that the mirrors are moved (or walked through) diametrically opposite positions, e.g., mirror 1 in upper left quadrant, mirror 2 in lower right quadrant, and so on. Although these various embodiments will be described herein, it should be noted that other variations will be apparent to those skilled in the art and are contemplated by the teachings herein. As such, the embodiments described herein are meant to be illustrative and not limiting in any way.

Figure 7:
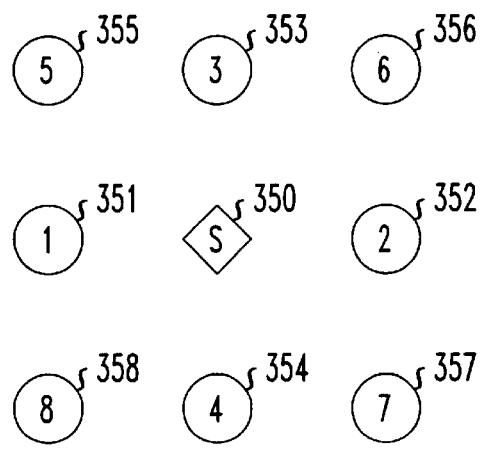
FIG. 7 shows an exemplary layout of the relative positions of a MEMS mirror element used for the alignment process according to the principles of the invention.

FIGS. 7 and 8 illustrate a specific embodiment for dithering the mirrors according to the principles of the invention. More specifically, FIG. 7 illustrates an exemplary layout of the relative positions that a single mirror could be walked through during a dithering process to find the maximum output signal power for the cross-connection. As shown, a start position 350 represents the position that a mirror is initially set at based on the initial control voltage settings applied to the mirror when a cross-connection is first established, e.g., the factory settings. The remaining eight positions, e.g., first position 351, second position 352 and so on through eighth position 358 represent the positions that the mirror is moved to (or walked through) during the dithering process. The amount that a mirror is moved/tilted during the dithering process is a matter of design choice. In one embodiment, the amount of movement associated with the eight positions 351–358 in FIG. 7 can be calculated based on the stored control voltage settings. For purposes of dithering according to the invention, the relative positions 351–358 are considered incremental steps such that moving an input mirror into one of these tilt positions will not cause the input mirror to then reflect light to an entirely different output mirror that is not associated with the cross-connection. In this way, the mirrors are trained while maintaining the active cross-connection at an acceptable level to avoid any disruption in service. As such, the amount to move/tilt a mirror is only a percentage of the amount that would be used to redirect the light beam to a completely different output mirror, e.g., small step sizes for the control voltages.

One approach for determining the amount to move/tilt the mirror, e.g., the control voltage step size, is to interpolate the amount based on the known (and stored) control voltage settings that are associated with aligning a particular input mirror to focus light onto its next nearest neighbor output mirror and the second nearest neighbors' output mirrors. For example, the result of the interpolation might be that the particular input mirror should be moved/tilted one-tenth of the distance to it nearest neighbor output mirror. The same procedure would be used for determining the amount to move/tilt an output mirror. For example, the value of the control voltage to focus light to one-tenth of the distance to the next nearest input mirror would be calculated by interpolating the values from the next nearest neighbor and second nearest neighbor input mirrors. Again, these examples are meant to be illustrative only.

FIG. 8 is a simplified flowchart illustrating another illustrative embodiment of a method for walking a mirror through the various positions shown in FIG. 7 to optimize (e.g., maximize) the output power of a cross-connection. As previously described, the dithering process to obtain optimal mirror alignment is initiated once it has been determined that the difference between the actual power loss (measured) and expected power loss (stored in database) for a cross-connection is greater than a prescribed threshold. Once the dithering process begins, the mirror is moved to determine which of the nine positions 350–358 (including start position 350) provides the "better" performance, e.g., maximum output power for the signal being cross-connected. The criteria for determining "better" performance is used as a gauge for when to terminate the dithering process. That is, dithering should not continue indefinitely, but rather only needs to be performed to optimize the cross-connection. As such, the criteria for determining when dithering can be stopped is a matter of design choice and, in one example, could be when the power raises by 0.1dB or 0.2dB over the original power level. Again, this example is only meant to be illustrative and not limiting.

Referring to both FIGS. 7 and 8, the mirror is moved in step 400 from start position (S) 350 to first position 351 (e.g., by changing the control voltage as previously described). The output power is then measured in step 401 to determine whether the output power has increased by the prescribed amount. If so, then the mirror is moved to the fifth position 355 in step 402. If the output power has increased by the prescribed amount, as determined in step 403, then the new mirror position for the cross-connection is set to be at the fifth position 355 as shown in step 404 and the dithering process for this mirror is completed. In one embodiment, the fifth position then becomes the start position (S) 350 for any subsequent dithering that is performed for the cross-connection. If the output power has not increased by the prescribed amount, as determined in step 403, then the mirror is moved to the eighth position 358 in step 405. Similarly, the output power is checked in step 406 and if it has increased by the prescribed amount, then the new mirror position (and new start position) for the cross-connection is set to be at the eighth position 358 as shown in step 407 and the dithering process for this mirror is completed. If the power has not increased by the prescribed amount when checked in step 406, then the new mirror position (and new start position) for the mirror is set to be at the first position 351 as shown in step 408 and dithering is completed.

If the output power measured in step 401 has not increased by the prescribed amount, then the mirror is moved to second position 352 in step 410. If the output power when the mirror is in second position 352 has increased by the prescribed amount, as determined in step 411, then the mirror is moved to sixth position 356 in step 412. If the output power has increased by the prescribed amount, as determined in step 413, then the new mirror start position for the cross-connection is set to be at the sixth position 356 as shown in step 414 and the dithering process for this mirror is completed. If the output power has not increased by the prescribed amount, as determined in step 413, then the mirror is moved to the seventh position 357 in step 415. Similarly, the output power is checked in step 416 and if it has increased by the prescribed amount, then the new mirror start position for the cross-connection is set to be at the seventh position 357 as shown in step 417 and the dithering process for this mirror is completed. If the power has not increased by the prescribed amount when checked in step 416, then the new mirror start position is set to be at the second position 352 as shown in step 418 and dithering is completed.

If the output power when the mirror is in second position 352 has not increased by the prescribed amount, as determined in step 411, then the mirror is moved to third position 353 in step 420. If the output power has increased by the prescribed amount, as determined in step 421, then the new mirror start position for the cross-connection is set to be at the third position 353 as shown in step 422 and the dithering process for this mirror is completed. If the output power has not increased by the prescribed amount, as determined in step 421, then the mirror is moved to the fourth position 354 in step 423. Similarly, the output power is checked in step 424 and if it has increased by the prescribed amount, then the new mirror start position for the cross-connection is set to be at the fourth position 354 as shown in step 425 and the dithering process for this mirror is completed. If the power has not increased by the prescribed amount when checked in step 424, then the mirror is returned to the original start position (S) 350 in step 426 and dithering is completed. It should be noted that the above process is meant to be illustrative only and modifications, such as changes in the sequencing of steps, will be apparent to those skilled in the art and are contemplated by the teachings herein.

For the optical cross-connect shown and described in FIGS. 1–3, the above process in one embodiment would be performed on one of the mirrors first (e.g., the input mirror) and, upon completion, would then be performed on the other mirror used in the cross-connection (e.g., the output mirror). According to another aspect of the invention, the dithering process could be repeated if one of the mirrors is moved to a new start position after the dithering process. If both mirrors are in the same position before and after the dithering process, the system could then be placed in an idle state for a predetermined time. Alternatively, the process could run on a continuous basis. The frequency and duration of the dithering process is also a matter of design choice. For example, a large scale, high capacity cross-connect used in a network environment where cross-connections remain in place for long periods of time could warrant that the dithering process run on a less frequent basis in order to conserve processing resources.

As previously mentioned, dithering can be performed on two mirrors at the same time whereby each of the mirrors is moved in a parallel relationship such that each mirror is moved (or walked through) the same positions at substantially the same time. More specifically, the process described in FIG. 8 (steps 400 through 426) could be applied to both mirrors simultaneously such that each of the mirrors is moved at substantially the same time and in a parallel manner to corresponding positions. For example, in step 402, both mirrors would be moved to their respective fifth positions 355. The other aspects of the process remain the same and will not be repeated here for sake of brevity.

In the other approach previously mentioned, dithering can be performed on two mirrors at the same time whereby each of the mirrors is moved in an anti-parallel relationship such that the mirrors are moved (or walked through) diametrically opposite positions. Referring to FIG. 7, the diametrically opposite positions would be as follows: first position 351 and second position 352; third position 353 and fourth position 354; fifth position 355 and seventh position 357; and sixth position 356 and eighth position 358. Again, the process in FIG. 8 can be applied, with modifications that will be apparent to those skilled in the art, to this scenario. For example, in step 402, one mirror would be moved to its fifth position 355 while the other mirror is moved to its seventh position 357. It should be noted that the amount of movement for each of the mirrors can also be different. For example, one mirror can be moved according to the previously described criteria, e.g., one-tenth of the distance to it nearest neighbor output mirror, while the other mirror in the pairing can be moved two-tenths of the distance, and so on.

In yet another illustrative embodiment, the dithering process can be implemented using a "walk and dither" algorithm, whereby a first mirror, e.g., input mirror, is walked while a second mirror, e.g., output mirror, is dithered. In this example, "walk" means that a mirror is moved in one direction, e.g., by one control voltage step and "dither" means a mirror is moved sequentially in various directions (e.g., up, down, left, right) while the other mirror remains in one walk position. To apply a walk or dither step to a mirror means that software, for example, adjusts the control voltages applied to the mirror. In these examples, voltage step sizes can vary for input and output mirrors and, for each mirror, can vary in the different directions of movement, e.g., left, right, up, and down.

In a "walk and dither" type of approach, the output power is measured first to establish an original power level, i.e., a baseline level. Next, the first mirror, e.g., input mirror, is walked to a first position, e.g., left, right, up or down and the second mirror, e.g., output mirror, is then dithered (moved) in all directions while the output power is continually monitored. If the monitored output power in any of these first set of positions is greater than the original baseline power, then the input mirror remains at the position to where it was moved and the output mirror is moved to the position where the greatest power was received at the output monitor, the new voltage settings for both mirrors are recorded, and the process can be halted from the input mirror perspective. If the first set of positions does not produce an output power that is greater than the original baseline power, then the mirrors are restored to their original pre-dither positions and the above steps can be repeated for the other positions, e.g., walk input mirror to second position and dither the output mirror, walk input mirror to third position and dither the output mirror, and so on. Once a higher output power is achieved with the above steps, the process can then be repeated in a manner such that the roles of the input and output mirrors are reversed. That is, the output mirror would be walked while the input mirror is dithered.

As previously indicated, dithering can be used for various purposes such as, for example, assessing cross-connection success, maintaining and improving signal strength, and so on. Dithering to adjust the mirrors can be a background operation performed on all active connections in the system on a periodic basis, sequential basis, cyclical basis, and so on. Moreover, the actual triggers for when the position of a mirror would be changed can be based on other considerations. In this way, the amount and the timing of adjustments can be controlled to efficiently use processing time and resources.

The foregoing embodiments are merely illustrative of the principles of the invention. Those skilled in the art will be able to devise numerous arrangements, which, although not explicitly shown or described herein, nevertheless embody those principles that are within the scope of the invention. The principles of the invention can be applied in different applications involving a MEMS-based network element, such as measuring for loss of signal or equipment/path failure in a protection switching scheme. For example, detecting loss of signal at the input to a MEMS fabric could be used for initiating appropriate alarming and/or protection switching mechanisms. Similarly, loss of signal at the output of the MEMS fabric (assuming no loss of signal detected at the inputs), can be used to effect equipment protection switching mechanisms (e.g., switch to alternate circuit pack, fabric, etc.). Other modifications will be apparent to those skilled in the art and are contemplated by the teachings herein. Accordingly, the scope of the invention is limited only by the claims appended hereto.

It should also be noted that the functions of the various elements shown in the drawing may be provided through the use of dedicated hardware as well as hardware capable of executing software. When provided by a processor, the functions may be provided by a single dedicated processor, by a single shared processor, or by a plurality of individual processors, some of which may be shared. Moreover, a "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage.

What is claimed is:

1. A method of training an optical cross-connect having one or more steerable mirrors for routing optical signals, the method comprising:

measuring input signal power of an optical signal at an input of the cross-connect;

measuring output signal power of the optical signal at an output of the cross-connect, wherein the optical signal is routed from the input to the output of the cross-connect by at least one steerable mirror; and controllably adjusting the alignment of the at least one steerable mirror as a function of the input signal power and output signal power of the optical signal while maintaining an active cross-connection of the optical signal.

2. The method according to claim 1, wherein the one or more steerable mirrors are micro-electromechanical system (MEMS) mirrors.

3. The method according to claim 1, wherein controllably adjusting comprises:

retrieving a stored value that corresponds to an expected signal power loss for the active cross-connection;

determining an actual signal power loss based on the measured input signal power and measured output signal power; and comparing the actual signal power loss to the expected signal power loss to determine a difference value.

4. The method according to claim 3, further comprising the step of maintaining present alignment settings of the at least one steerable mirror if the difference value is less than a prescribed threshold.

5. The method according to claim 3, further comprising the step of initiating adjustment of alignment settings of the at least one steerable mirror if the difference value exceeds a prescribed threshold.

6. The method according to claim 1, wherein controllably adjusting comprises incrementally adjusting a tilt position of the at least one steerable mirror.

7. The method according to claim 6, wherein incrementally adjusting a tilt position comprises applying control voltages in a prescribed manner to control electrodes associated with the at least one steerable mirror.

8. The method according to claim 7, wherein incrementally adjusting comprises the step of determining a control voltage step size as a function of control voltage settings that align the at least one steerable mirror to one or more next nearest neighbor mirrors.

9. The method according to claim 6, further comprising the step of monitoring output signal power to identify a tilt position that provides increased optical signal power in the active cross-connection.

10. The method according to claim 9, wherein the step of incrementally adjusting is terminated when the increased optical signal power exceeds a predetermined threshold.

11. The method according to claim 6, wherein the optical signal is routed from the input to the output of the cross-connect by a first steerable mirror and a second steerable mirror, and wherein the first steerable mirror and the second steerable mirror are incrementally adjusted on a sequential basis.

12. The method according to claim 6, wherein the optical signal is routed from the input to the output of the cross-connect by a first steerable mirror and a second steerable mirror, and wherein the first steerable mirror and the second steerable mirror are incrementally adjusted on a simultaneous basis.

13. The method according to claim 6, wherein the optical signal is routed from the input to the output of the cross-connect by a first steerable mirror and a second steerable mirror, and wherein the first steerable mirror and the second steerable mirror are incrementally adjusted on a simultaneous basis with corresponding adjustments in tilt position.

14. The method according to claim 6, wherein the optical signal is routed from the input to the output of the cross-connect by a first steerable mirror and a second steerable mirror, and wherein the first steerable mirror and the second steerable mirror are incrementally adjusted on a simultaneous basis with diametrically opposite adjustments in tilt position.

15. The method according to claim 6, wherein the optical signal is routed from the input to the output of the cross-connect by a first steerable mirror and a second steerable mirror, and wherein the step of controllably adjusting comprises a walk and dither sequence comprising:
determining a baseline output signal power for the active cross-connection;
walking the first steerable mirror to a first tilt position;
dithering the second steerable mirror through a plurality of tilt positions while the first steerable mirror is at the first tilt position;
monitoring output signal power for each of the plurality of tilt positions; and terminating the walk and dither sequence if the monitored output signal power exceeds the baseline output signal power by a prescribed amount.

16. The method according to claim 15, further comprising:
if the monitored output signal power does not exceed the baseline output signal power by a prescribed amount, walking the first steerable mirror to a second tilt position; and
repeating the dithering and monitoring steps.

17. A method of increasing optical signal power of an optical signal routed through an optical cross-connect having a plurality of steerable switching elements, the method comprising:
measuring input signal power of an optical signal at an input of the cross-connect;
measuring output signal power of the optical signal at an output of the cross-connect, wherein the optical signal is routed from the input to the output of the cross-connect by at least one steerable switching element; and
controllably adjusting the alignment of the at least one steerable switching element as a function of the input signal power and output signal power of the optical signal while maintaining an active cross-connection of the optical signal.

18. The method according to claim 17, wherein controllably adjusting the alignment includes:
comparing an actual optical power loss associated with the active cross-connection with a previously stored value representing the expected optical power loss for the active cross-connection; and
adjusting the alignment of the at least one steerable switching element if the difference between the actual power loss and expected power loss exceeds a prescribed threshold.

19. The method according to claim 18, wherein the actual optical power loss is calculated by subtracting the measured output signal power from the measured input signal power.

20. The method according to claim 19, wherein adjusting the alignment includes walking the at least one steerable switching element through alternate positions to identify a position that provides increased optical signal power in the optical signal associated with the active cross-connection.

21. A system for increasing optical signal power of an optical signal routed through an optical cross-connect having a plurality of steerable switching elements, the system comprising:
an input signal monitor for measuring input signal power of an optical signal at an input of the cross-connect;
an output signal monitor for measuring output signal power of the optical signal at an output of the cross-connect, wherein the optical signal is routed from the input to the output of the cross-connect by at least one steerable switching element; and
a controller for controlling alignment adjustments to the at least one steerable switching element as a function of the input signal power and output signal power of the optical signal while maintaining an active cross-connection of the optical signal.

22. The system according to claim 21, wherein the input signal monitor and output signal monitor each comprise:
an optical tap for tapping off a portion of optical signal power of the optical signal;
a photodetector coupled to the optical tap for supplying an electrical signal indicative of the tapped optical signal power;

a transimpedance amplifier circuit coupled to the photodetector for translating current to voltage in the electrical signal; and an analog to digital converter for producing a digital representation of the electrical signal.

23. The system according to claim 22, wherein the controller is responsive to an electrical signal supplied by each of the input and output signal monitors to initiate alignment adjustments.

24. A system for training steerable switching elements in an optical cross-connect comprising:

an input signal monitor for measuring input signal power of an optical signal at an input of the cross-connect;

an output signal monitor for measuring output signal power of the optical signal at an output of the cross-connect, wherein the optical signal is routed from the input to the output of the cross-connect by at least one steerable switching element; and a controller for controlling dither of the at least one steerable switching element as a function of the input signal power and output signal power of the optical signal while maintaining an active cross-connection of the optical signal.

* * * * *